United States Patent [19] [11] Patent Number: 5,293,696
Schmidt et al. [45] Date of Patent: Mar. 15, 1994

[54] DEVICE FOR THE DEHYDRATION OF SEWAGE SLUDGE

[75] Inventors: Gerhard Schmidt, Sherwood Park, Canada; Heinz Schmidt, Erftstadt, Fed. Rep. of Germany

[73] Assignee: Axbridge Holdings Ltd., Canada

[21] Appl. No.: 752,676

[22] PCT Filed: Mar. 1, 1990

[86] PCT No.: PCT/CA90/00074
§ 371 Date: Oct. 11, 1991
§ 102(e) Date: Oct. 11, 1991

[87] PCT Pub. No.: WO90/09967
PCT Pub. Date: Sep. 7, 1990

[30] Foreign Application Priority Data

Mar. 2, 1989 [EP] European Pat. Off. ........ 89103604.8

[51] Int. Cl.5 ............................................. F26B 21/06
[52] U.S. Cl. ........................................ 34/76; 34/180; 34/183
[58] Field of Search .................. 34/180, 181, 182, 183, 34/73, 76

[56] References Cited

U.S. PATENT DOCUMENTS

| 3,800,865 | 4/1974 | Onarheim et al. | 34/183 X |
|---|---|---|---|
| 3,997,406 | 12/1976 | Arvanitakis | 34/73 X |
| 4,156,392 | 5/1979 | Bayeh | 34/182 X |
| 4,176,465 | 12/1979 | Murray et al. | |
| 4,685,220 | 8/1987 | Meenan et al. | 34/73 X |
| 4,756,092 | 7/1988 | Anderson | 34/183 X |

FOREIGN PATENT DOCUMENTS

| 1146813 | 5/1983 | Canada |
| 1080930 | 4/1960 | Fed. Rep. of Germany |
| 1922230 | 11/1969 | Fed. Rep. of Germany |
| 1658136 | 12/1970 | Fed. Rep. of Germany |
| 3544300 | 7/1987 | Fed. Rep. of Germany |
| 2050589 | 1/1981 | United Kingdom |

Primary Examiner—Martin P. Schwadron
Assistant Examiner—Kevin L. Lee
Attorney, Agent, or Firm—Davis, Bujold & Streck

[57] ABSTRACT

A method and apparatus for dehydrating sewage sludge is described. Sewage sludge is placed into a dehydration chamber. The sewage sludge is heated to convert moisture in the sewage sludge to steam and cause gasification. Steam and gases are drawn from the dehydration chamber into a condenser, where the steam is condensed to form hot water. Gases are drawn from the condenser to a burner.

5 Claims, 7 Drawing Sheets

DEVICE FOR THE DEHYDRATION OF SEWAGE SLUDGE

The invention concerns a method and a device for the dehydration of sewage sludge, in particular the sludge which accumulates in municipal sewage plants.

BACKGROUND OF THE INVENTION

The fresh or decayed sludge which accumulates in large volumes in such sewage plants consists of less than 10% solid matter. To be utilized or eliminate, this sludge must first be dehydrated. Through mechanical dehydration methods, such as suction cell filtering, sludge is reduced to a consistency of about 30% solid matter; thus it is still composed mainly of water.

SUMMARY OF THE INVENTION

What is required is an improved apparatus for dehydrating sewage sludge.

The process which has been developed to meet the need outlined above is as follows: radiant heat and hot air are produced simultaneously through the combustion of heating oil or gas. Then the radiant heat acts on the sewage sludge while it is being conveyed mechanically. At the same time, the sewage sludge undergoes an indirect heat exchange with the hot air.

According to another aspect of the invention there is provided an apparatus for dehydration of sewage sludge, which is comprised of a dehydration chamber having an intake opening and a discharge opening. Mechanical conveyance means is used to convey sewage sludge from the intake opening to the discharge opening. A plurality of radiant heaters with burners disposed in side by side relation, each of the radiant heaters having heat radiation surfaces disposed within the dehydration chamber which radiate heat at temperatures in excess of 850 degrees centigrade, whereby sewage sludge is heated to convert moisture in the sewage sludge to steam and most harmful organic compounds contained in the sewage sludge are broken down. A condenser adjoining the dehydration chamber, means being provided to draw steam from the dehydration chamber into the condenser, whereby the steam is condensed to form hot water and gases. A gas vent pipe diverting gases from the condenser to one of the burners of the radiant heaters, whereby the gases are heated to temperatures in excess of 1700 degrees centigrade thereby breaking down harmful dioxins contained in the gases.

In the thermal sludge dehydration process described polluted air is drawn through the incineration zone so that the pollutants can be burned and wet sewage sludge, whether free or decayed, is reduced to a solid-matter consistency of more than 95%. Further advantages in this new process and device can be seen from the following description.

The process which has been developed to meet the need outlined above is as follows: radiant heat and hot air are produced simultaneously through the combustion of heating oil or gas. Then the radiant heat acts on the sewage sludge while it is being conveyed mechanically. At the same time, the sewage sludge undergoes an indirect heat exchange with the hot air which has been generated. The vapours produced from the sludge are then suctioned off from the space above the sludge and are condensed. As a result of the effect of heat radiation and the simultaneous transfer of heat from the hot air to the wet sewage sludge, considerable dehydration is already taking place, e.g. from less then 10% solid content to between 50 and 90%. In the process, a considerable volume of steam is produced. The volatile organic pollutants, such as hydrocarbons and dioxins, given off by the sludge as it is being mechanically moved, are cracked or broken down due to the influence of heat radiation during the steam phase. The products of cracking or disintegration are on the whole harmless and therefore—so long as they condense with the vapours—do not pollute the condensate. Disintegration of the sludge through oxidation is not possible, the steam thus generated being almost completely free of oxygen, so that the sludge does not come into contact with oxygen.

In the recommended method of carrying out the process, the sludge which has been partially dried by means of radiant heat in the first stage undergoes a second, and possibly further, drying stages, by means of mechanical conveyance and indirect heat exchange using the hot air generated. Vapours produced in the second and any subsequent drying stages are drawn off with a stream of warm air and condensed. While in the first (open) stage, only vapours are drawn off into the condenser by means of an air stream, in subsequent stages steam produced from the sludge is also drawn off in this manner. For this purpose, hot air which has been partially cooled through the exchange of heat in the second and any subsequent stages is used as the warm air stream for the removal of the vapours produced in these stages. It is recommended that the air stream remaining after the vapours have condensed be utilized as combustion air in the burning of heating oil or gas, so that any pollutants contained in the air stream can be burned.

In the recommended procedure, a heat exchange is carried out between the hot air produced by burning the heating oil or gas at a temperature of 500 to 850 degrees C., and the sewage sludge. This heat exchange is necessarily indirect, so that the sludge does not come into contact with air and, once the sludge has been almost completely dried, no oxidative disintegration can occur.

The sewage sludge is moved in two consecutive stages in opposite directions, generally in a straight line. By mounting the levels on top of each other and moving the sludge in alternate directions, it is possible to carry out the dehydration on a comparatively small surface area, so that the device can be mounted on a vehicle.

In the first stage of this process, organic compounds, in particular hydrocarbons and/or dioxins, which has been released from the sewage sludge, are cracked in the steam phase by radiant heat at temperatures of about 850 to 1200 degrees C. A particular feature of this process is the high temperatures produced during the steam phase—ranging in general between 800 and 2300 degrees C., and optimally between 900 and 1150 degrees C.—and the fact that at the same time there is no contact with the oxygen of the air, the result being that the sludge releases its water quickly without oxidative disintegration, and also that the pollutants which were released from the sludge into the steam at that phase in the process are cracked or broken down into less toxic or harmless compounds.

It is recommended that the vapours which developed in the first stage be drawn into the condenser by means of low pressure. One way to keep the pressure of the condenser low is to place a suction draught fan on the opposite side of the condenser. The gases remaining after condensation can be filtered and then used for burning heating oil or gas. In order to obtain an extensive vapour condensation, condensation is carried out by means of heat exchange, using water which has been cooled in a deep freeze unit during the cycle.

Other devices used in the process are: several heat radiators, placed side by side, each with a combustion chamber in which the lower wall is constructed as a heat radiation surface, and with a heating oil or gas burned in each combustion chamber, and a heat exchanger for heating the air with the hot combustion gases situated, in a dehydration chamber underneath the heat radiation surfaces; open conveyor systems, which extend more or less from one end of the radiation zone of the heat radiator to the other end, thus allowing for the indirect heating of the sewage sludge by means of hot air; and a condenser, which is connected with the dehydration chamber by a pipe. The device consists therefore principally of: heat radiators, which produce hot air in addition to radiating heat; the sewage sludge conveyor systems, which convey the sewage sludge past the heat radiation zone, subjecting it to radiant heat, so that it releases water in the form of steam; and the condenser for condensing the steam generated in this process. It is also significant that the heat exchanger and heat radiator are integrated, and together form a compact unit, so that a mobile dehydrator can be equipped with several such heat radiators. The heat radiates in a conical shape from each radiator. Therefore, the placing of several heat radiators in a row allows for a much longer radiation zone, along which the sewage sludge conveyors are arranged longitudinally.

It is recommended that the sewage sludge conveyor consist of several troughs placed side by side in a parallel arrangement, with conveyor augers revolving in the troughs, and that the troughs be fitted with a casing and the augers with a hollow shaft for heating with the hot air. The hot air which is generated in the heat exchanger that surrounds the radiator combustion chambers like a ring is used for heating these troughs augers, by conducting the air, which has been heated to 850 degrees C., first through the trough casing and then, in the opposite direction, through the hollow shaft of the auger. It is recommended that for this procedure suction tubes fitted with openings be fastened along the sides of the troughs, and that these be connected to the condenser. These suction tubes are kept at low pressure by the condenser, so that the vapours given off by the sewage sludge are drawn up into the suction tubes and from there into the condenser.

A further refinement of the device consists of the placing of at least one and preferably two levels of closed sewage sludge conveyor systems underneath the open conveyor system, their path being much the same as that of the open system, and each level moving the sludge in the opposite direction from the ones above and below it. In the closed conveyors the partially dehydrated sewage sludge is dried still more than a consistency of at least 95% and, optimally, of at least 98% solid matter. The multi-level arrangement of the conveyors on top of each other allows for a compact structure which occupies a comparatively small space. In this recommenced design, the closed conveyors consist on each level of several parallel pipes containing rotating augers. The pipes are fitted with a casing and the conveyor augers with a hollow shaft for the hot air heating process, and along the length of each pipe a suction tube is mounted and connected to the pipe's inner chamber by means of openings which are connected at one end to the central bore-hole of the hollow shaft or the casing of the pipe in question and on the other end to the condenser. Each conveyor level can consist of from five to about fifteen, optimally of eight to twelve, troughs or pipes. The heating of the pipes is carried out in the same manner as the heating of the troughs, in that the hot air from one of the heat radiators is conducted into a level of pipe augers. From the auger, the hot air is first conducted through the pipe casing, then through the hollow shaft into the suction tube and finally into the condenser. The vapours produced in the pipes pass through the openings in the suction tube and are carried by the air stream into the condenser, where they are condensed.

It is recommended that in this method each trough and the pipes lying underneath it be joined by connecting pipes placed alternately at both ends, so that the sewage sludge is conveyed in alternate directions through the trough and the pipes.

The connecting pipes on the lowest level of auger pipes are mounted onto the discharge auger, which is located at a 90 degree angle to the auger pipes above it. The lowest level of pipes, which may consist of about 10 auger pipes, delivers the dried sludge through the connecting pipes into the discharge auger, from which the dried sludge is then expelled sideways.

The conveyor augers are mounted onto drives, and the rotating speed of the motors of any one level of augers can be controlled independently of that of the others. In this manner, it is possible to set a different processing time for the sewage sludge in the trough level than in the lower auger level, that is, each level may be adjusted separately to suit the type of sludge or the speed of vaporization.

It has also been designed so that the feeding device can be placed at one end of the dehydration chamber, protruding from the chamber wall, and connected on the intake side with a loading funnel, and on the discharge side over the intake end of the open sludge conveyor. One way of loading the sludge through the funnel would be with conveyor belt. It is recommended that there be an equal number of feeding augers—these could be pipe augers—as there are troughs. By this method, each feeding auger is placed together with a trough. This feeding augers can also be heated by means of the warm air discharged from the hollow shaft of the respective trough auger.

It is recommended that the device be mounted on a chassis. In this way it is possible to transport the portable device from place to place by means of a vehicle such as a semitrailer. In this way, even small sewage plants, where a lesser volume of sludge requires only occasional dehydration, can take advantage of this new process.

BRIEF DESCRIPTION OF THE DRAWINGS

This invention is illustrated by the following diagrams.

DETAILED DESCRIPTION OF THE INVENTION

Figure 1:
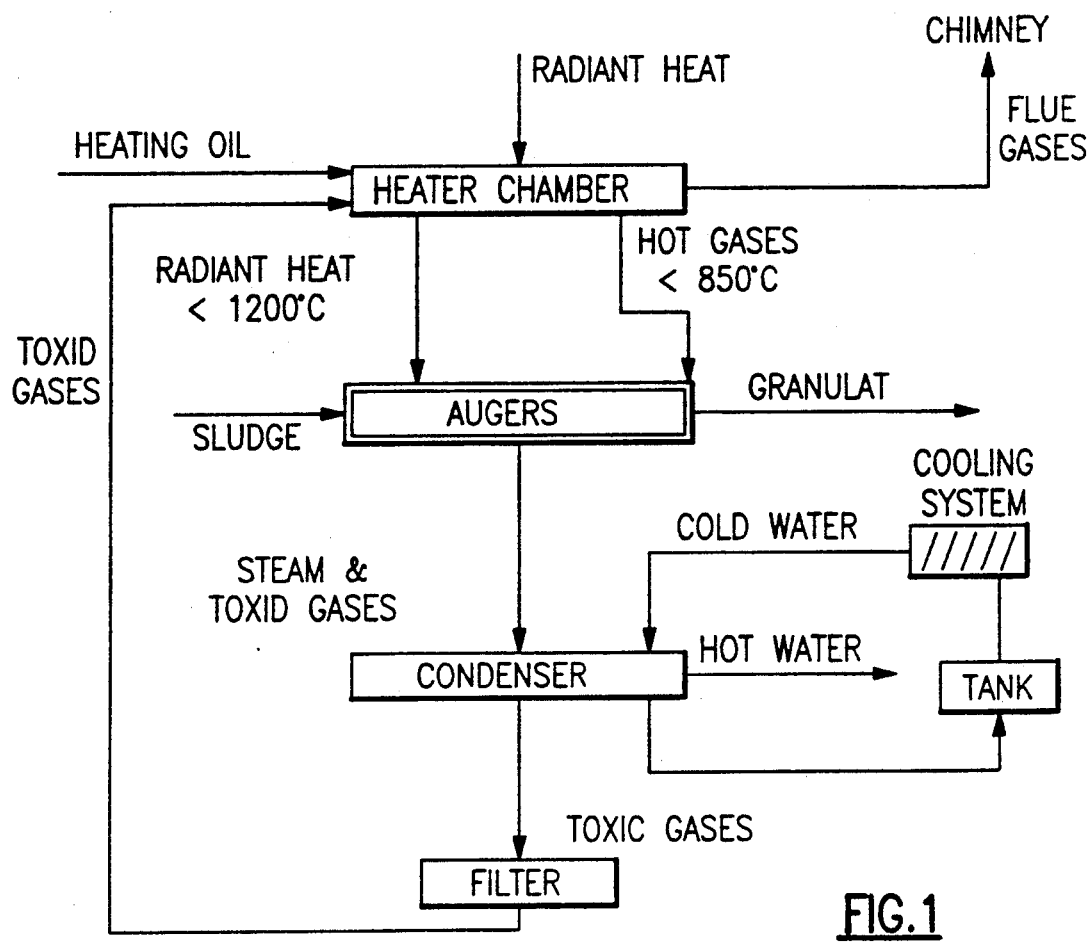
FIG. 1 shows a simplified flow chart of the new process.

The diagram in FIG. 1 illustrates the important stages in the new process and is self-explanatory.

The operation of the embodiment illustrated in FIG. 4, will hereinafter be described. Heat is radiated from all radiators onto the top trough auger. The hot air produced by any one radiator is directed to only one auger level, for example the trough augers or one or the other levels of pipe augers. The air first flows through the casing of the auger and then enters the bore-hole of the auger shaft from the casing. In the case of the trough augers, the hot air is discharged from the auger shaft and into the intake auger, in order to heat it up as well. As this hot air was only exchanged indirectly with the sludge, it does not contain any pollutants and can be discharged into the atmosphere on the other end of the intake auger. One method is to mix it with smoke and conduct it into the chimney. The vapours produced in the trough auger are drawn through the suction tube into the condenser and thence condensed.

In the case of the pipe auger, the hot air again enters the casing first and passes from there into the auger shaft. Then the still warm air flows through the suction tube of the auger and conveys the vapours given off from the sewage sludge into the condenser. After the vapours have been condensed, the remaining air is used for burning in the heat radiators.

Figure 3:
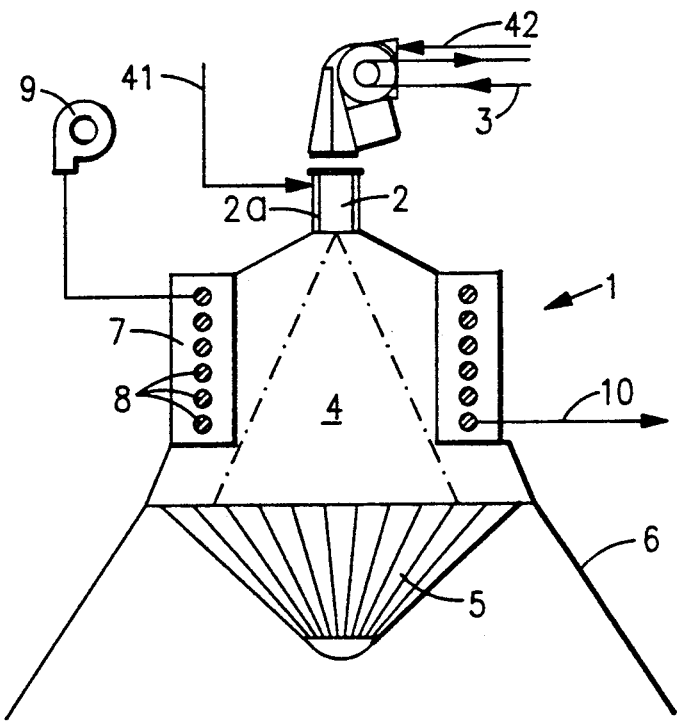
FIG. 3 shows a simplified section view of the heat radiator as used in the new process.

FIG. 3 shows a heat radiator (1) for the production of infrared radiation and hot air, to be used in this innovative dehydration device. The heat radiator has a heating oil burner (2), to which heating oil is conducted through a pipe (3) and combustion air through another pipe (42). The burner (2) is covered with a hollow casing (2a) which has an opening to the combustion chamber (4). This casing receives discharge air from the vapour condenser (18) via pipe (41). The temperature in the combustion chamber (4) can be as high as 1700 degrees C. The metallic radiation cone (5) radiates heat downward, resulting in temperatures under the cone of up to 1200 degrees C. The radiation cone (5) is surrounded by a blunt conical reflection shield (6), which bundles the heat radiation. The chamber (4) is surrounded by another chamber (7), through which the hot combustion gas flows from combustion chamber (4). Chamber (7) contains a helical pipe (8), which is connected to an air fan (9). The fan (9) draws in air from the surrounding area and forces it through the heat exchanger (8, 7). The hot air thereby generated exits from the heat exchanger (10) at a temperature of up to 850 degrees C., optimally between 600 and 800 degrees C.

Figure 4:
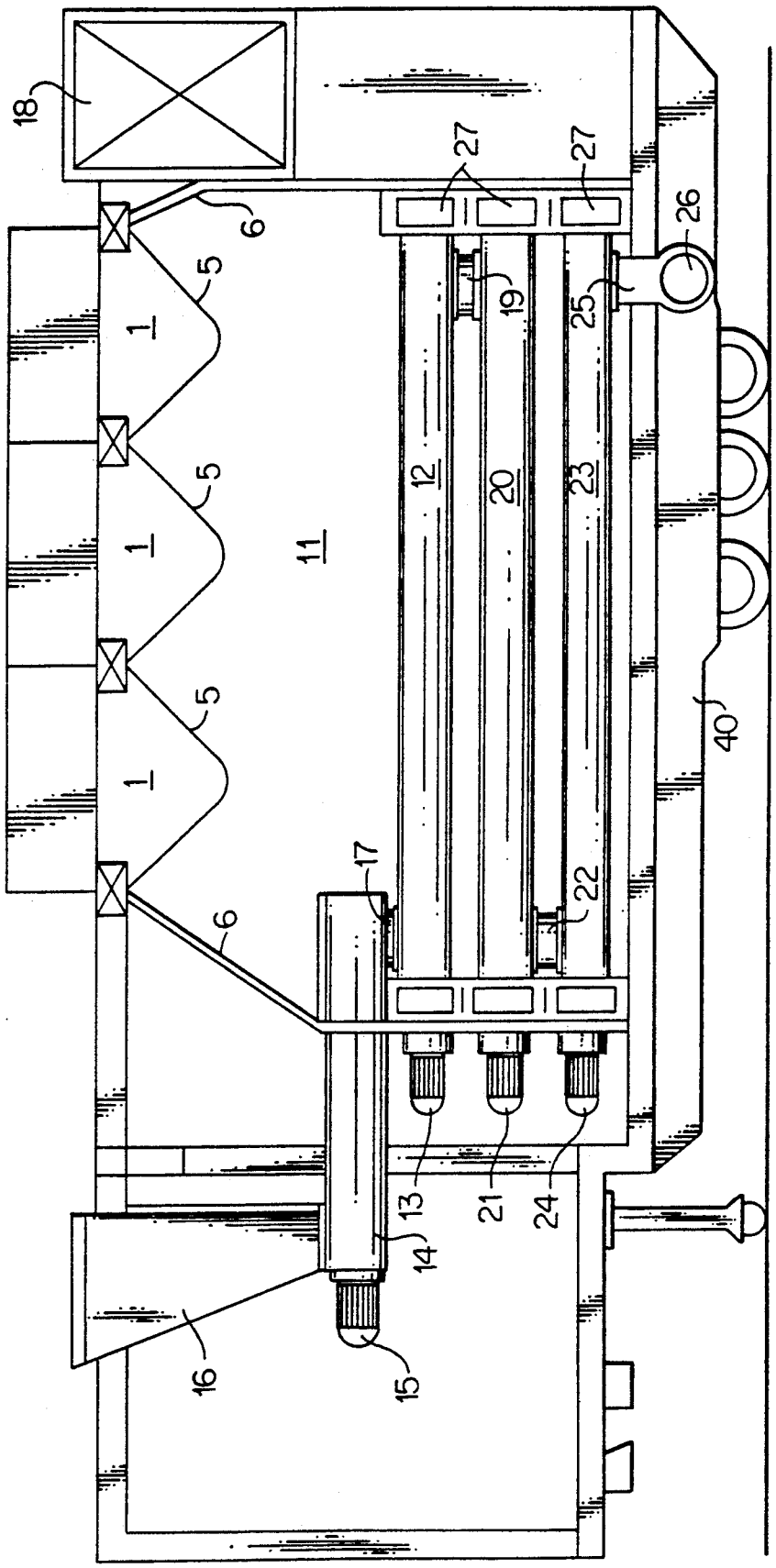
FIG. 4 shows an overall diagram of the new device.

The newly invented device shown in FIG. 4 is mounted on a semi-trailer chassis (40), which can be towed by a tractor. The device contains three heat radiators (1), which radiate heat conically (5) onto the dehydration chamber (11) below. In the dehydration chamber (11), ten trough augers (12) are placed along the side of the vehicle and are driven by electric motors (13). Each trough auger (12) is supplied by an intake auger (14), which is likewise driven by an electric motor (15). The row of intake augers (14) takes up the wet sewage sludge from a supply funnel (16) and conveys it to a connecting pipe (17), through which the sludge is forced into the auger trough (12). In trough (12), the wet sewage sludge is exposed directly to the heat from the three radiators (1). In addition, the trough (12) and the auger shaft are heated by the hot air, as will be explained in more detail below. The wet sewage sludge is conveyed through the auger of the trough to the other end of the pipe, rotated about, and dehydrated to a considerable extent. The vapours released in this process are drawn up into a suction tube, which will be described in greater detail below, and from there conducted into a condenser (18), where they are condensed.

The partially dehydrated sewage sludge passes through the connecting pipe (19) into the auger pipe (20), the auger being driven by an electric motor (21). In the auger pipe (20), the partially dehydrated sewage sludge is conveyed forward again to a connecting pipe (22). The auger pipe (20) is heated by means of hot air from the middle heat radiator (1), so that the dehydration process continues as the sludge is conveyed to connecting pipe (22). The vapours produced during this process are drawn up by means of a warm air stream through the suction tube into pipe (20), which is described in greater detail below, are also fed into the condenser (18), where they are condensed.

Figure 2:
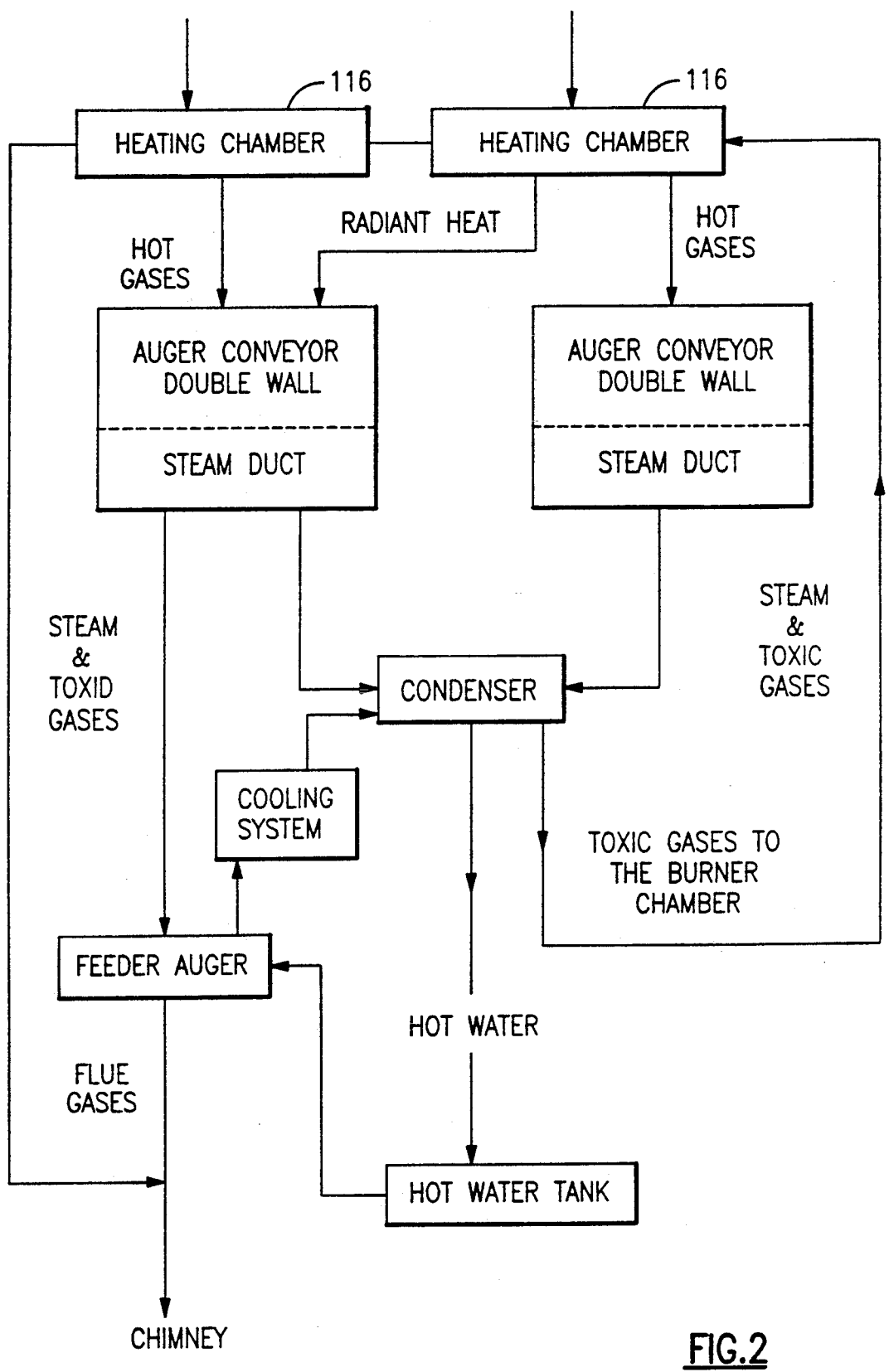
FIG. 2 shows a simplified flow chart of the air intake and discharge system in the new process.

The now highly dehydrated sewage sludge passes through the connecting pipe (22) into the auger pipe below (23), in which the sludge is almost completely dehydrated, i.e. it is dried to a consistency of about 98% solid matter. The auger of the pipe (23) is also driven by an electric motor (24), which conveys the sludge backward to connecting pipe (25). The dry sludge is forced through the connecting pipe (25) into the discharge auger (26), which is placed at a 90 degree angle, and which discharges the dehydrated sludge laterally from the device. On both ends of both the auger through (12) and the auger pipes (20, 23) air boxes (27) are provided to conduct the air, as shown in detail in FIG. 2, are in particular to direct it from the casing into the bore-hole of the hollow shaft.

Figure 5:
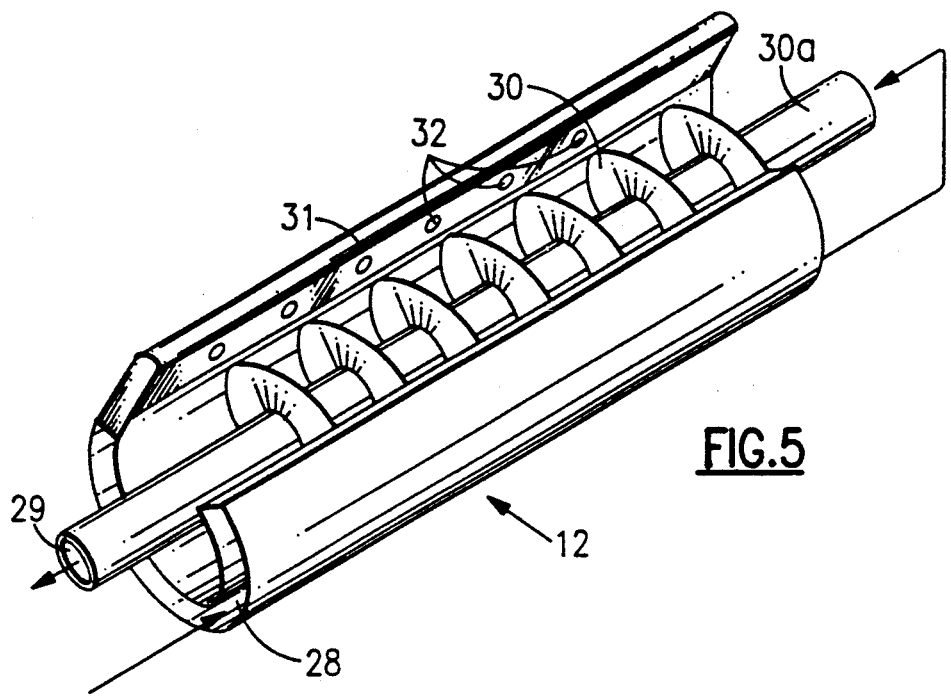
FIG. 5 shows a three-dimensional drawing of the trough auger used in the device.

The auger trough (12) which is shown in FIG. 5 in simplified form, has a hollow casing (28), through which the hot air generated from a heat radiator (1) is drawn. The hot air discharged from casing (28) enters the bore-hole (29) of the auger shaft (30a), as shown by the arrow, and there heats up auger (30). A suction tube (31) is connected to the auger trough (12), which is provided with row of openings (32) on the side of auger (30). The suction tube (31) leads to the condenser (18) (not shown), which is kept at a low pressure, so that the vapours released from the sewage sludge in trough (12) are drawn into the condenser through the openings (32) and the suction tube (31).

Figure 6:
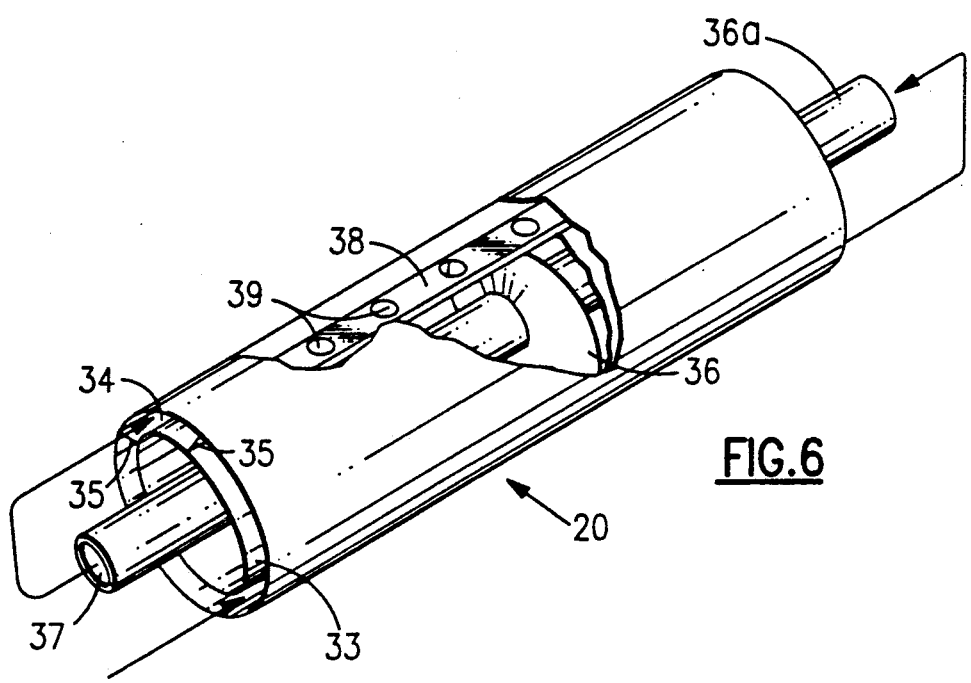
FIG. 6 shows a three-dimensional drawing of the pipe auger used in the device, with a portion of the outer casing cut away.

The auger pipe (20) shown in FIG. 6 is identical to auger pipe (23) and other augers pipes which, if needed, could be placed on a fourth level. The auger pipe (20) has a hollow casing (33) in which a suction tube (34) is separated by radial walls (35). The auger shaft (36a) of auger (36) is also provided with a bore-hole (37) for heating purposes. In the area of the suction tube (34), the inside wall (38) of pipe (20) is fitted with openings (39) over its entire length. Through these openings (39), the sewage sludge discharges its vapours into the suction tube. The hot air used to heat the auger pipe (20) is first conducted from a heat radiator (1) into the pipe casing (33), in the direction shown by the arrow, and from there into bore-hole (37) of the auger shaft (36a), and finally into the suction tube (34), through which the vapours are drawn off and conveyed by an air stream into the condenser (18).

Figure 7:
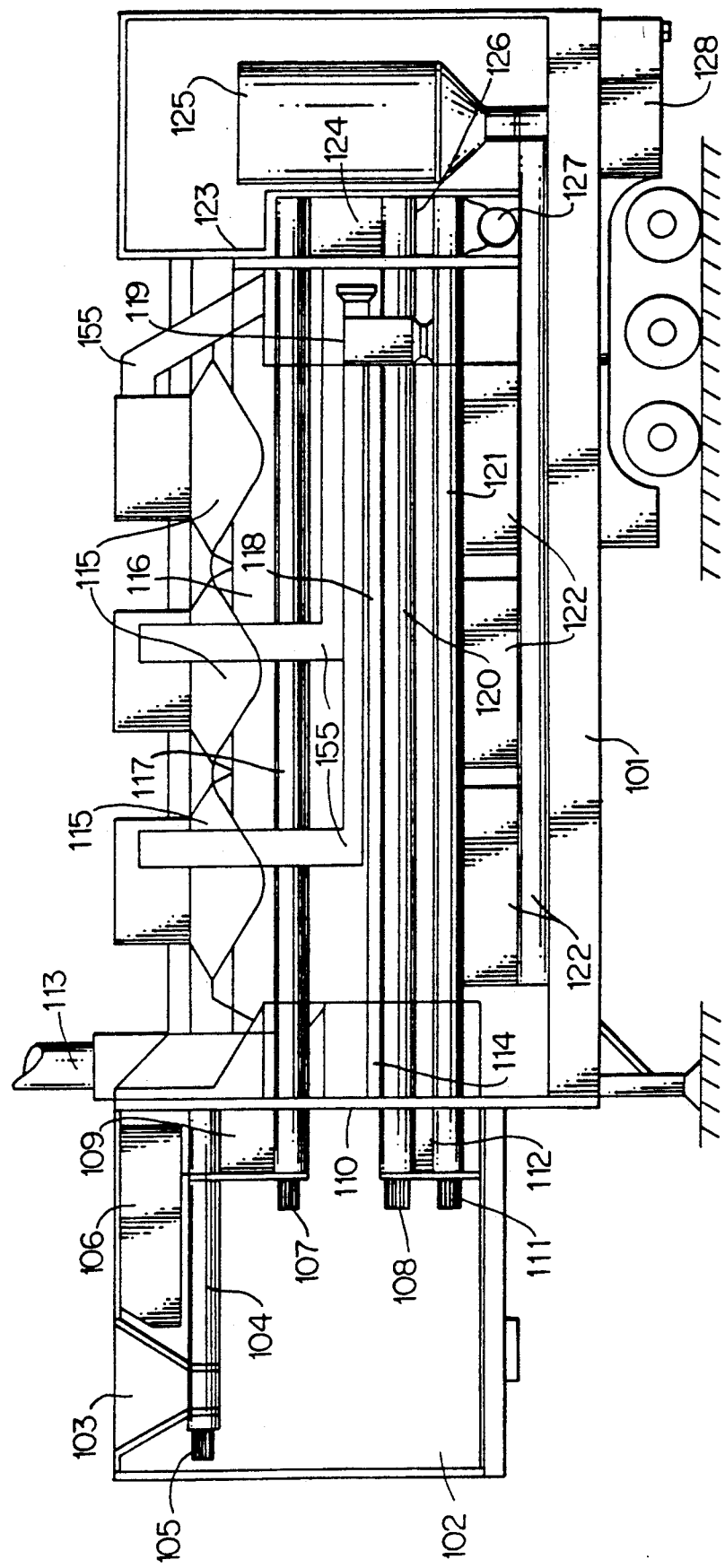
FIG. 7 shows a three-dimensional drawing of an alternate embodiment of the invention.
Figure 8:
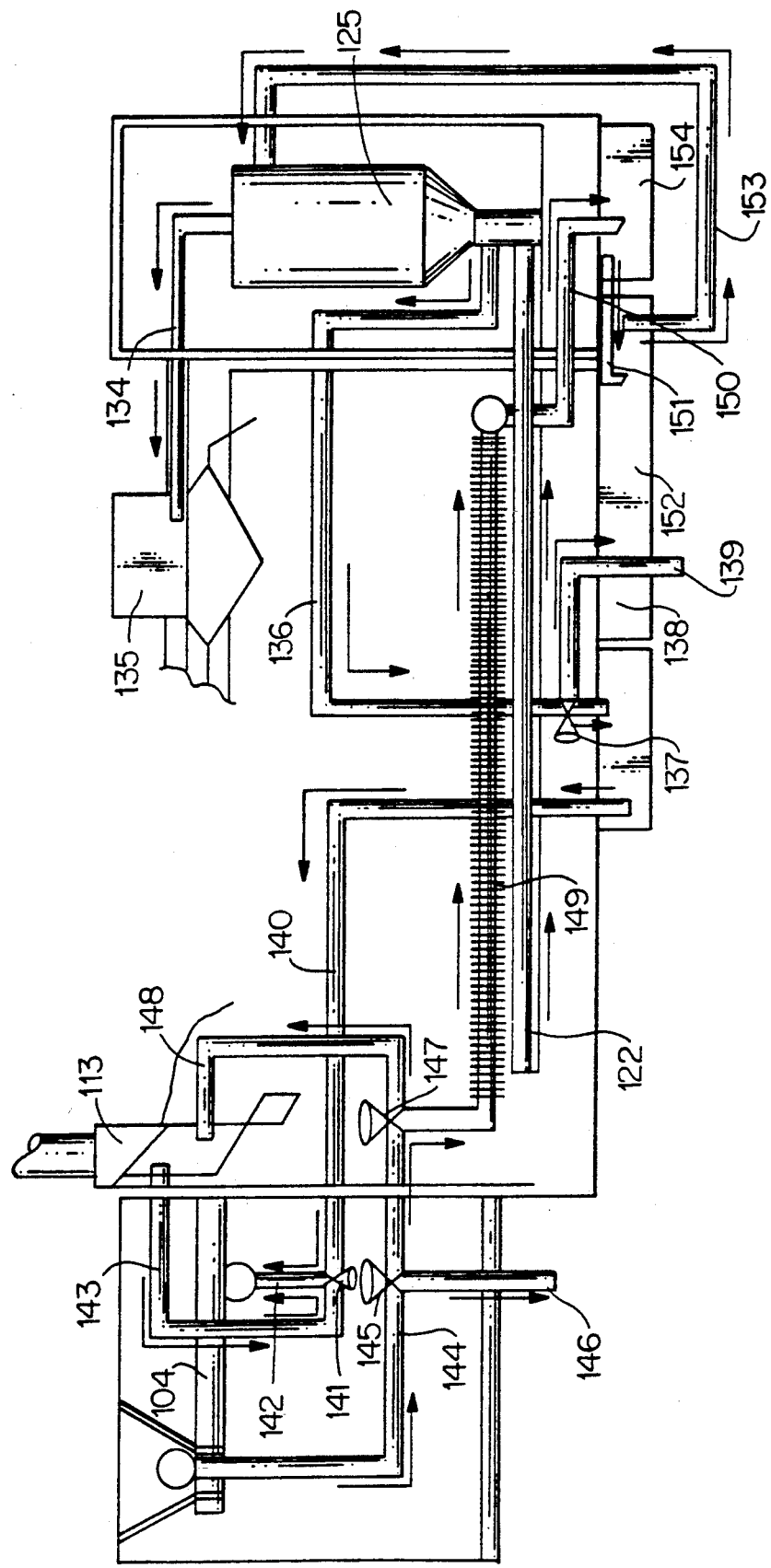
FIG. 8 shows a simplified drawing of the pipe system of the alternate embodiment.
Figure 9:
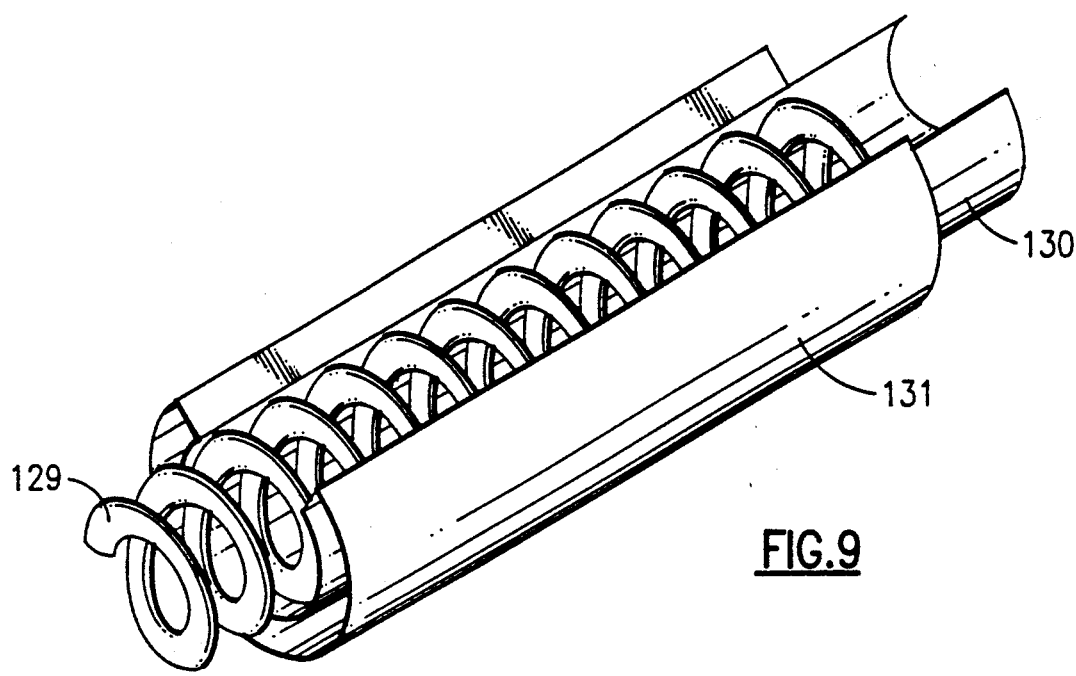
FIG. 9 shows a three-dimensional view of the top trough auger used in the alternate embodiment.
Figure 10:
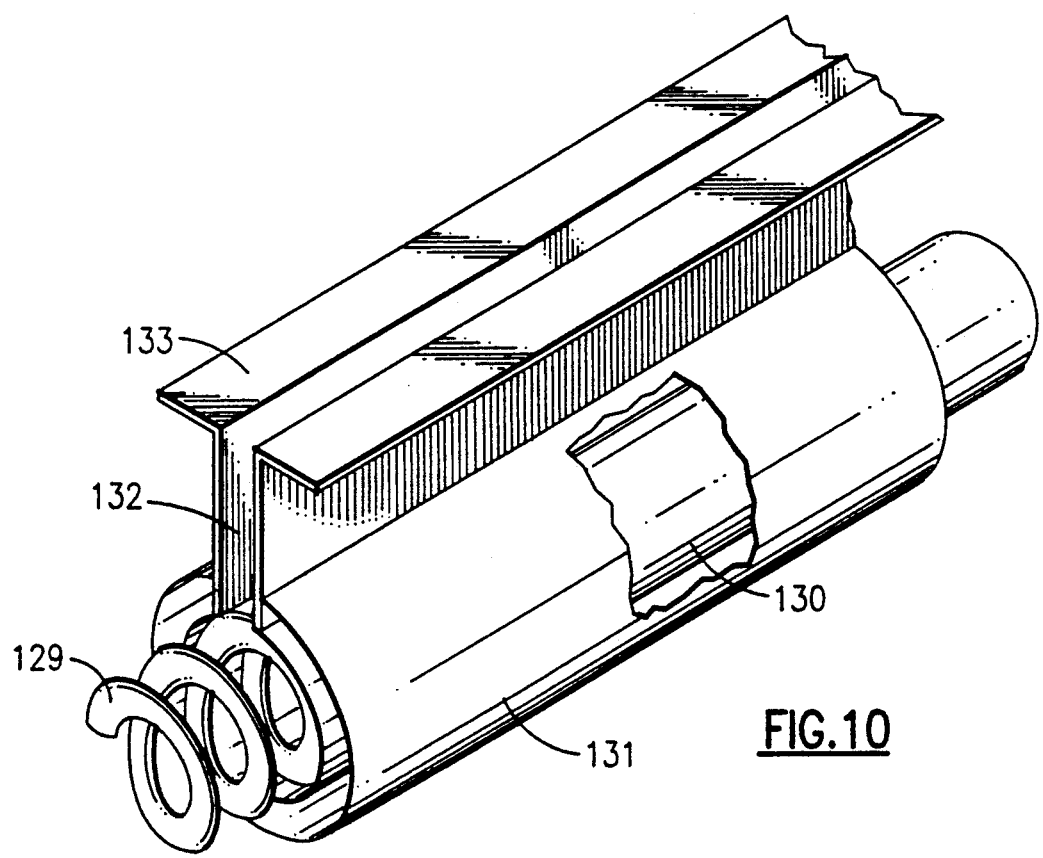
FIG. 10 shows a three-dimensional view of the lower trough auger used in the alternate embodiment, with a portion of the outer casing cut away.

The alternate embodiment illustrated in FIGS. 7 through 10, represents an improved embodiment of the invention. Along with modifications which will hereinafter be described, this embodiment is capable of attaining higher temperature levels. The alternate embodiment has been modified to alter the method by which a heat exchange is effected within the trough auger. Flexibility has also been provided as to whether the heat transfer is effected using hot water or not exhaust gases. FIG. 2 shows schematically the movement of sewage sludge, the flow of hot exhaust gases, the flow of steam and toxic gases, and the circulation of hot water within the system, as will be hereinafter described. Referring to FIGS. 7 and 8, there is illustrated an apparatus for dehydration of sewage sludge. The alternate embodiment has a dehydration chamber which is enclosed by insulating walls 110 and 123. The dehydration chamber is actually divided into two smaller chambers, a heat chamber 116 and a steam chamber 118. The dehydration chamber has an intake opening 103 and a discharge opening 127. A plurality of troughs 117, 120, and 121 are disposed in levels within dehydration chamber 118. Trough 117 is positioned within heat chamber 116 and troughs 120 and 121 are positioned within steam chamber 118. Each trough has rotatably mounted augers 129, for mechanically conveying sewage sludge. Sewage sludge is thereby moved from intake opening 103 through a series of augers to discharge opening 127. Troughs 117, 120, and 121 are arranged within the dehydration chamber on a number of levels; a top level— trough 117, a middle level—trough 120 and a lower level—trough 121. Each of level has substantially the same conveyance path which moves sewage sludge in alternating directions from level to level in sequence. This is accomplished through the use of a plurality of transfer boxes. As sewage sludge enters intake opening 103 it is conveyed by along an auger trough 104 to a transfer box 109, where the sewage sludge is transferred from auger trough 104 on an entry level to auger trough 117 on the top level. Sewage sludge is then conveyed along auger trough 117 to transfer box 124, where the sewage sludge is transferred from auger trough 117 on the top level to auger trough 120 on the middle level. Sewage sludge is then conveyed in the opposite direction along auger trough 120 to transfer box 112, where the sewage sludge is transferred from auger trough 120 on the middle level to auger trough 121 on the lower level. A further change in direction then occurs and sewage sludge is conveyed along auger trough 121 to transfer box 126, where the sewage sludge is transferred from auger trough 121 on the lower level to discharge opening 127. Referring to FIGS. 9 and 10, each trough has a hollow sidewall 131 defining a fluid flow passage 130. There is a difference in construction between trough auger 117 and trough augers 120 and 121. Trough auger 117 is illustrated in FIG. 9. Trough augers 120 and 121 are similar in construction and this construction is illustrated in FIG. 10. A plurality of radiant heaters 115 with burners 135 are disposed in side by side relation within heat chamber 116. Each of radiant heaters 115 have heat radiation surfaces disposed within heat chamber 116 which radiate heat at temperatures in excess of 850 degrees centigrade. In the alternate embodiment, the maximum temperature of the radiation surface is 1600 degrees. The preferred operating temperature is 1250 degrees. The sewage sludge is heated to convert moisture in the sewage sludge to steam and cause gasification. At the described temperatures the most harmful organic compounds contained in the sewage sludge are broken down. The distance between the radiation surfaces of heaters 115 and the sewage sludge on top auger trough 117 is 10 centimeters at its closest point and averages 35 centimeters. As is illustrated in FIG. 9, top auger trough 117 has a cut out at the top with a circular area of about 70 degrees. As a result approximately 67% of top auger trough 117 is exposed to the energy source and subjected to infrared rays. The dark grained surface of the sewage sludge allows a high rate of absorption of radiant energy from heaters 115. Auger troughs 104, 117, 120, and 121, have motors 105, 107, 108, and 111, respectively which rotate auger 129. Auger 129 is a special spiral auger with a relatively high revolution rate. It conveys sewage sludge along the auger troughs at 40 to 60 revolutions per minute. The sewage sludge in the conveying pipe is constantly turned and moved to prevent the premature "baking" of the material. A condenser 125 adjoins the dehydration chamber. There is a free flow a steam from heat chamber 116 to steam chamber 118. Steam is drawn via steam ducts 122 from dehydration chamber 118 into condenser 125. As is best illustrated in FIG. 10, troughs 120 and 121 have connecting steam ducts 132. Steam from heat chamber 116 can enter steam ducts 132 via the opening defined by flanges 133. Steam ducts 132 are connected to steam ducts 122. In condenser 125 steam is condensed to form hot water and gases. The steam enters condenser 125 from underneath. A "barrel condenser" process is used wherein the steam is sprayed with cold water from tank 128 in order for it to condense. The resulting function in volume and the closed system of the steam ducts 122 and 132 causes a significant under pressure. The developing vacuum suction draws steam and gases out of steam chamber 118 via steam ducts 122 and 132. In order to stabilize and secure this operation a suction fan is installed at the end of each lower steam duct. The hot water which is condensed flows through hot water pipe 136 to valve 137. Valve 137 provides the operator with the option of collecting hot water in hot water tank 138 or redirecting the flow of hot water through pipe 139 for external use. This water is substantially free of pollutants. As the heat in heat chamber 116 and steam chamber 118 causes a gasification of the sewage sludge to occur, gases are drawn into condenser 25 along with steam. The gases produced include methane, and depending upon the nature of the sewage sludge may carry dioxins. These gases are diverted via a gas vent pipe 134 from condenser 125 to one of burners 135 of radiant heaters 115. In burner 135 the gases are burned at temperatures in excess of 1200 degrees centrigrade thereby breaking down harmful dioxins contained in the gases. In the alternate embodiment, the burner flames reach temperatures of 1900 degrees. Exhaust gases from burners 135 are ultimately released through chimney 113. However, the exhaust gases from burners 135 have a temperature of 850 degrees and are therefore a valuable source of potential energy. For this reason each of burners 135 have an exhaust gas pipe 155 which connects with an exhaust gas distribution box 119. Exhaust gas distribution box 119 serves to connect each one of exhaust gas pipes 155 with fluid flow passage 130 from one of trough augers 117, 120, or 121. After flowing through fluid flow passages 130 of the respective trough augers the exhaust gases are collected at an exhaust gas collection box 114 which is connected to chimney 113. Similarly, the hot water produced by condenser 125 is a secondary source of energy and is connected to a system for circulation of the hot water. For reasons of convenience the hot water is first accumulated in hot water tank 138. A first fluid flow line consisting of pipes 140 and 142 connects condenser 125 via hot water tank 138 with fluid flow passage 130 defined by the hollow sidewall 131 in auger trough 104. This permits a heat exchange to occur transferring heat from the hot water to the sewage sludge. The circulation of hot water through the first fluid flow line is completed by pipes 144. On pipe 144 is a valve 145 which gives the operator the option of directing the return of water through radiator 149, and pipe 150 to cold water tank 128, or to divert the water for external use through pipe 146. It must be appreciated that the system will always be producing a surplus of water which must be periodically removed from the system. A second fluid flow line indirectly connects the exhaust of the burners 135, via chimney 113, with fluid flow passage 130 defined by hollow sidewall 131 of auger trough 104. Second fluid flow line consists of pipes 143, and 142 which represent an inflow of hot exhaust gases from chimney 113 to fluid flow passage 130 of auger trough 104. Pipes 144 and 148 which represent an outflow of exhaust gases from auger trough 104 back to chimney 113. Of course, hot water and hot exhaust gases cannot be used at the same time to preheat auger through 104. The operator makes a selection as to which source of energy for preheating he wishes to use by adjusting valves 141 and 147. Valve 141 controls whether hot water or gas has access to pipe 142 leading into fluid flow passage 130 of auger trough 104. Valve 147 controls whether fluids returning from auger trough 104 are directed to cold water tank 128 or to chimney 113. Water tank 128 has two compartments, a small holding compartment 154 and a larger holding compartment which has greater capacity 152. Compartments 154 and 152 are connected by an overflow pipe 151. A line 153 goes from compartment 152 into the top of condenser 125, for use in the condensation of steam as has previously been described. The system is compact enough to be mounted on a trailer 101, which has an operator control area 102.

The embodiments of the invention in which an exclusive property or priviledge is claimed are defined as follows:

1. An apparatus for dehydration of sewage sludge, comprising:
   a. a dehydration chamber having an intake opening and a discharge opening;
   b. a plurality of troughs in which are rotatably mounted augers, the troughs being disposed in the dehydration chamber for mechanically conveying sewage sludge from the intake opening to the discharge opening, the troughs being arranged within the dehydration chamber on a number of levels, each level having substantially the same conveyance path which move sewage sludge in alternating directions from level to level in sequence, each trough having a hollow sidewall defining a fluid flow passage;
   c. a plurality of radiant heaters with burners disposed in side by side relation, each of the radiant heaters having heat radiation surfaces disposed within the dehydration chamber which radiate heat at temperatures in excess of 850 degrees centigrade, whereby sewage sludge is heated to convert moisture in the sewage sludge to steam, cause gasification and breakdown harmful organic compounds contained in the sewage sludge;
   d. a condenser adjoining the dehydration chamber, means being provided to draw steam and gases from the dehydration chamber into the condenser, whereby the steam is condensed to form hot water;
   e. a gas vent pipe diverting gases from the condenser to one of the burners of the radiant heaters, whereby the gases are burned at temperatures in excess of 1700 degrees centigrade thereby breaking down harmful dioxins contained in the gases;
   f. a first fluid flow line connecting the condenser with the fluid flow passage defined by the hollow sidewall, whereby hot water from the condenser is directed through the fluid flow passage;
   g. a second fluid flow line connecting an exhaust port of one of the burners with the fluid flow passage defined by the hollow sidewall, whereby hot exhaust gases from one of the burners of the radiant heaters are directed through the fluid flow passage; and
   h. valves on the first fluid flow line and the second fluid flow line, whereby a selection may be made as to whether fluids from the first fluid flow line or second fluid flow line are directed through the fluid flow passage to effect a heat exchange with sewage sludge being carried by the auger.

2. An apparatus for dehydration of sewage sludge, comprising:
   a. a dehydration chamber having an intake opening and a discharge opening;
   b. a trough in which is rotatably mounted an auger for conveying sewage sludge from the intake opening to the discharge opening, the auger having a hollow shaft defining a fluid flow passage whereby preheated fluids are passed through the fluid flow passage to effect a heat exchange with sewage sludge being carried by the auger;
   c. a plurality of radiant heaters with burners disposed in side by side relation, each of the radiant heaters having heat radiation surfaces disposed within the dehydration chamber which radiate heat, whereby sewage sludge is heated to convert moisture in the sewage sludge to steam and cause a gasification;
   d. a condenser adjoining the dehydration chamber, means being provided to draw steam and gases from the dehydration chamber into the condenser, whereby the steam is condensed to form hot water;
   e. a gas vent pipe diverting gases from the condenser to one of the burners of the radiant heaters, whereby the gases are burned; and
   f. a first fluid flow line connecting the condenser with the fluid flow passage, whereby hot water from the condenser is directed through the fluid flow passage.

3. An Apparatus as defined in claim 2, wherein a second fluid flow line connects an exhaust port of one of the burners with the fluid flow passage, whereby hot gases from the exhaust port is directed through the fluid flow passage.

4. An Apparatus as defined in claim 2, wherein a second fluid flow line connects an exhaust port of one of the burners with the fluid flow passage defined by the hollow sidewall, and valve means are provided for selecting whether hot gases from at least one of the exhaust port and the hot water from the condenser are directed through the fluid flow passage.

5. In an apparatus for dehydration of sewage sludge consisting of a dehydration chamber (11) having an intake opening (17) and a discharge opening (25), mechanical conveyance means for conveying sewage sludge from the intake opening (17) to the discharge opening (25), a plurality of radiant heaters (1) with burners (2) disposed in side by side relation, each of the radiant heaters (1) having heat radiation surfaces (5) disposed within the dehydration chamber (11) which radiates heat whereby sewage sludge is heated to convert moisture in the sewage sludge to steam and cause gasification, a condenser (18) adjoining the dehydration chamber (11), means (31 and 32) being provided to draw steam and gases from the dehydration chamber (11) into the condenser (18) whereby the steam is condensed to form hot water, and a gas vent pipe (134) diverting gases from the condenser (18) to one of the burners (2) of the radiant heater (1) whereby the gases are burned, wherein the improvement comprises said mechanical conveyance means being in the form of a spiral auger (129) disposed in a trough (117) such that sewage sludge in the trough (117) is exposed to radiant heat, the trough (117) having a hollow sidewall (131) defining a fluid flow passage (130) whereby preheated fluids are passed through the fluid flow passage (130) to effect a heat exchange with sewage sludge in communication with the hollow sidewalls (131) of the trough (117), and a fluid flowline connects the condenser with the fluid flow passage whereby hot water from the condenser is directed through the fluid flow passage.

* * * * *